United States Patent
Sheth et al.

(10) Patent No.: US 12,473,854 B2
(45) Date of Patent: Nov. 18, 2025

(54) EXHAUST STRUCTURE FOR EXHAUST MANIFOLD

(71) Applicant: Caterpillar Inc., Peoria, IL (US)

(72) Inventors: Vikas Sheth, Edwards, IL (US);
Nataraj Srinivasan, Chennai (IN);
Pradeep Venugopal, Chennai (IN);
Parthiban Pechiyannan, Pin (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/602,543

(22) Filed: Mar. 12, 2024

(65) Prior Publication Data

US 2024/0309792 A1    Sep. 19, 2024

Related U.S. Application Data

(60) Provisional application No. 63/489,820, filed on Mar. 13, 2023.

(51) Int. Cl.
*F01N 13/10* (2010.01)

(52) U.S. Cl.
CPC .................. *F01N 13/10* (2013.01)

(58) Field of Classification Search
CPC ... F01N 13/10; F01N 2340/04; F01N 13/1805
See application file for complete search history.

(56) References Cited

U.S. PATENT DOCUMENTS

| 6,055,806 A * | 5/2000 | Dalton ............... F01N 13/10 |
| | | 123/193.5 |
| 6,892,532 B2 * | 5/2005 | Bruce ............... F02B 37/025 |
| | | 60/323 |
| 8,141,357 B2 | 3/2012 | Yamagata et al. |
| 8,166,754 B2 | 5/2012 | Frantzheld et al. |
| 9,388,770 B2 | 7/2016 | Tsujita et al. |
| 9,689,300 B2 * | 6/2017 | Kim ................... F02D 41/1441 |
| 2019/0032536 A1 * | 1/2019 | Mohr ................... F02M 35/10 |

FOREIGN PATENT DOCUMENTS

| CN | 101070776 B | 1/2011 |
| CN | 106481425 B | 1/2018 |
| CN | 207776954 U | 8/2018 |

(Continued)

*Primary Examiner* — Anthony Ayala Delgado
(74) *Attorney, Agent, or Firm* — Bookoff McAndrews, PLLC

(57) ABSTRACT

An exhaust structure for an exhaust manifold associated with an engine includes a first inlet section that defines a first inlet flow passage configured to receive exhaust gas, the first inlet flow passage defining a normalized cross-sectional area of flow, a second inlet section that defines a second inlet flow passage configured to receive exhaust gas, the second inlet flow passage defining the normalized cross-sectional area of flow, and an intermediate section disposed between the first inlet section and the second inlet section and in fluid communication with each of the first inlet section and the second inlet section, the intermediate section including: a flange and an exhaust redirection section having a reduced cross-sectional flow path measured at a midpoint along a length of the flange that is less than the normalized cross-sectional area of flow of the first inlet flow passage.

20 Claims, 10 Drawing Sheets

(56) References Cited

FOREIGN PATENT DOCUMENTS

| | | |
|---|---:|---:|
| CN | 214035846 U | 8/2021 |
| CN | 215256430 U | 12/2021 |
| CN | 216381589 U | 4/2022 |
| CN | 115030842 B | 11/2022 |
| EP | 2930326 B1 | 8/2017 |
| EP | 3303793 B1 | 8/2019 |
| JP | 5974802 B2 | 8/2016 |
| WO | 2019080330 A1 | 5/2019 |

* cited by examiner

EXHAUST STRUCTURE FOR EXHAUST MANIFOLD

CROSS-REFERENCE TO RELATED APPLICATION

This application claims the benefit of priority to U.S. Provisional Patent Application No. 63/489,820, filed on Mar. 13, 2023, the entirety of which is incorporated herein by reference.

TECHNICAL FIELD

The present disclosure relates to an exhaust structure for an exhaust manifold associated with an engine.

BACKGROUND

Some engine systems include an engine and a turbocharger that provides a desired power boost to the engine. Exhaust manifolds for these systems provide fluid communication between the engine and the turbocharger. Typically, a turbocharger is mounted to a central portion of the exhaust manifold, at an outlet side of the manifold. The central portion defines a first flow channel that receives exhaust gas from a number of first cylinders of the engine and a second flow channel that receives exhaust gas from a number of second cylinders of the engine. The central portion includes a flange disposed at the outlet side with a pair of separate outlet openings to guide exhaust away from the engine and towards a turbine of the turbocharger. Typically, the central portion includes a dividing wall or other isolating mechanism matching the profile of the turbine inlet of the turbocharger that completely separates the first flow channel from the second flow channel, such that exhaust from the first flow channel cannot enter the second flow channel.

Some turbochargers, such as variable turbine geometry (VTG) turbochargers, are not configured to easily incorporate conventional divider walls or isolating mechanisms. However, the absence of the divider wall or isolating mechanism may cause exhaust gas from the first flow channel to enter the second flow channel and vice versa, the first or second flow channel to enter the other flow channel, which may result in back pressure, may cause turbulence, and/or may have an undesirable impact on a performance/efficiency of the turbocharger.

U.S. Pat. No. 8,166,754 to Frantzheld et al. ("the '754 patent") describes an exhaust manifold for an internal combustion engine including a central part with two exhaust gas flow ducts extending from the central part in opposite directions for collecting exhaust gas from first and respectively second cylinder groups of the engine. The central part includes a first control valve for controlling the exhaust gas flow from the first and the second cylinder groups to first and second turbine inlet flow passages, a second control valve for controlling the exhaust gas pressure, and a third control valve for controlling the exhaust gas recirculation rate. The exhaust manifold described in '754 patent may provide exhaust gas recirculation, but does not guide opposing exhaust flows through an exhaust outlet formed without a dividing wall.

The devices and methods of this disclosure may address or solve one or more of the problems set forth above and/or other problems in the art. The scope of the current disclosure, however, is defined by the attached claims, and not by the ability to solve any specific problem.

SUMMARY OF THE DISCLOSURE

In one aspect, an exhaust structure for an exhaust manifold associated with an engine may include a first inlet section arranged at a first end of the exhaust structure, wherein the first inlet section defines a first inlet flow passage configured to receive exhaust gas, the first inlet flow passage defining a normalized cross-sectional area of flow and a second inlet section arranged at a second, opposite end of the exhaust structure, the second inlet section defining a second inlet flow passage configured to receive exhaust gas, the second inlet flow passage defining the normalized cross-sectional area of flow. The exhaust structure may also include an intermediate section disposed between the first inlet section and the second inlet section and in fluid communication with each of the first inlet section and the second inlet section. The intermediate section may include a flange, an outlet section defining an outlet flow passage extending through the flange, the outlet flow passage being in fluid communication with each of the first inlet flow passage and the second inlet flow passage and including an opening extending through the flange, and an exhaust redirection section disposed between the first inlet section and the second inlet section, the exhaust redirection section having a reduced cross-sectional flow path measured at a midpoint along a length of the flange that is less than the normalized cross-sectional area of flow of the first inlet flow passage.

In another aspect, an exhaust manifold for an engine may include an exhaust structure that includes a first inlet section arranged at a first side of the exhaust structure, wherein the first inlet section defines a first inlet flow passage in fluid communication with a first set of cylinders of the engine to receive exhaust gas therefrom, the first inlet flow passage having a diameter defining a normalized cross-sectional area of flow and a second inlet section arranged at a second side of the exhaust structure, wherein the second inlet section defines a second inlet flow passage in fluid communication with a second set of cylinders of the engine to receive exhaust gas therefrom, the second inlet flow passage having the diameter defining the normalized cross-sectional area of flow. The exhaust structure may also include an intermediate section disposed between the first inlet section and the second inlet section and in fluid communication with each of the first inlet section and the second inlet section, the intermediate section including a flange, an outlet section defining an outlet flow passage extending through the flange that is in fluid communication with each of the first inlet flow passage and the second inlet flow passage, the outlet flow passage including an opening through the flange through which exhaust gas from both the first inlet section and the second inlet section exits the exhaust structure, and an exhaust redirection section disposed between the first inlet section and the second inlet section, the exhaust redirection section defining a redirection flow passage adjacent the outlet section, the redirection flow passage defining a redirection cross-sectional area of flow, the redirection cross-sectional area of flow, measured at a midpoint of the flange, being less than the normalized cross-sectional area of flow of the first inlet flow passage. The exhaust manifold may also include a manifold portion secured to the exhaust structure at the second side of the exhaust structure, wherein the manifold portion is arranged to receive exhaust gas from at least one cylinder of the second set of cylinders In yet another aspect, an exhaust structure for an exhaust manifold may include a first inlet section that defines a first inlet flow passage, a second inlet section that defines a second inlet flow passage, and an intermediate section disposed between the first inlet section and the second inlet section and in fluid communication with each of the first inlet section and the second inlet section. The intermediate section may include a flange, an outlet section defining an outlet flow passage extending through the flange, the outlet flow passage being in fluid communication with each of the first inlet flow passage and the second inlet flow passage and including an outlet opening through the flange, and an exhaust redirection section disposed between the first inlet section and the second inlet section, the exhaust redirection section having areas of curvature configured to guide exhaust towards the outlet opening, including areas of curvature that define a ridge at a central portion of the exhaust redirection section.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
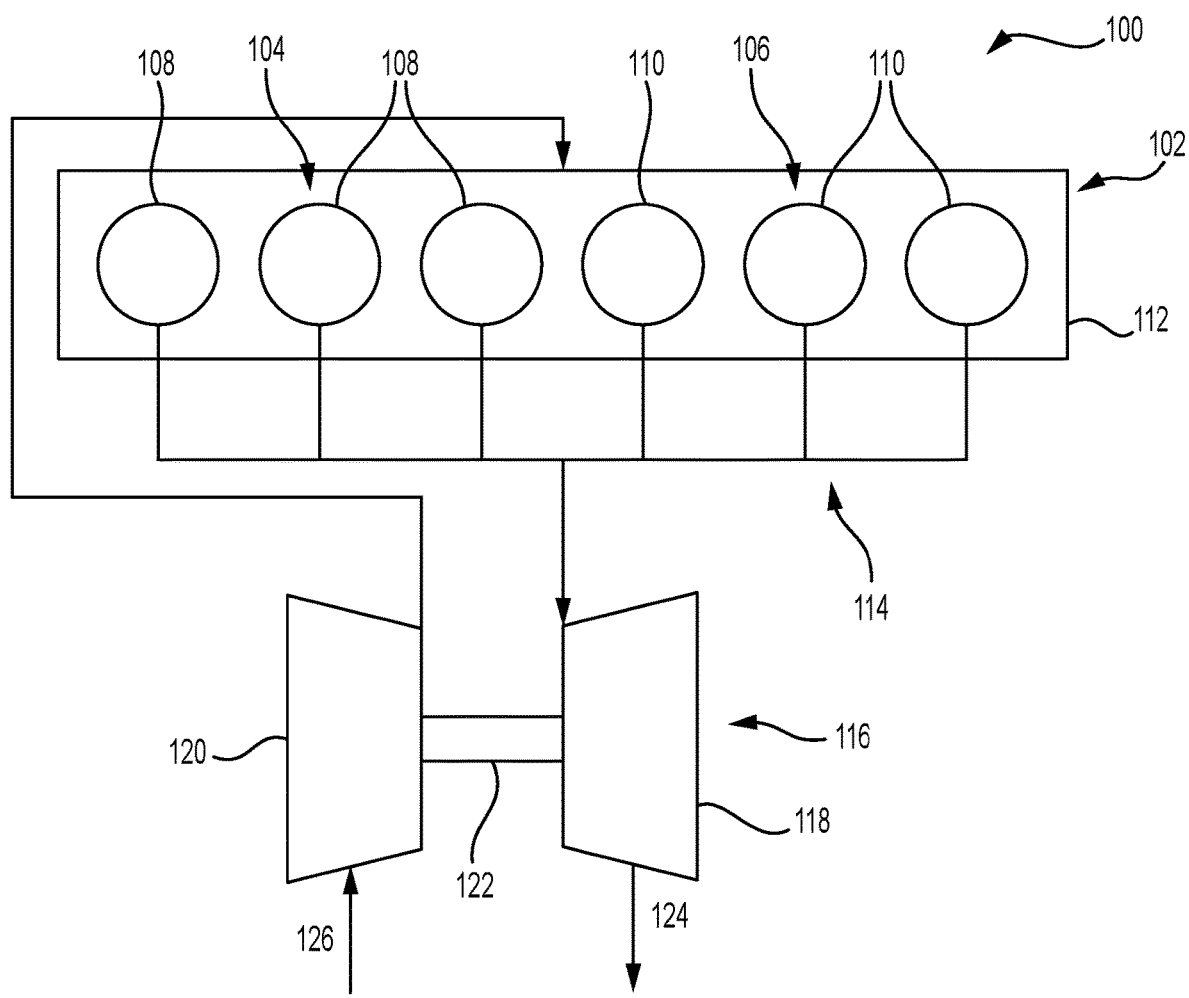
FIG. 1 is a schematic illustration of an engine system, in accordance with aspects of the present disclosure.

FIG. 1 illustrates an exemplary engine system 100. The engine system 100 may be associated with power generation systems, motor vehicles such as utility vehicles, or work machines, without any limitations thereto. The engine system 100 includes an engine 102. For the purposes of this disclosure, the engine 102 will be described as a four-stroke, compression ignition engine. One skilled in the art will recognize, however, that the engine 102 may be any other type of engine. The engine 102 may be fueled by any desired fuel, for example, diesel fuel and/or gaseous fuel.

The engine 102 includes a first set of cylinders 104 and a second set of cylinders 106. As used herein, a "set" of cylinders includes one or more cylinders. In the illustrated example, the first set of cylinders 104 includes three cylinders 108 and the second set of cylinders 106 includes three cylinders 110. The first and second set of cylinders 104, 106 may include any number of cylinders 108, 110, respectively, for a total of eight cylinders, ten cylinders, twelve cylinders, twenty cylinders, or more. As illustrated in FIG. 1, the engine 102 includes an engine block 112 that defines the first and second set of cylinders 104, 106.

A piston (not shown) may be slidably disposed within each cylinder 108, 110 to reciprocate between a top-dead-center (TDC) position and a bottom-dead-center (BDC) position. Further, a cylinder head (not shown) may be associated with each cylinder 108, 110. Each cylinder 108, 110, a corresponding piston, and a corresponding cylinder head may together define a combustion chamber (not shown). It is contemplated that the engine 102 may include any number of combustion chambers, and the combustion chambers may be disposed in an "in-line" configuration, a "V" configuration, or in any other suitable configuration.

In an example where the engine 102 is a four-stroke engine, each piston may reciprocate between the TDC and BDC positions through an intake stroke, a compression stroke, a combustion or power stroke, and an exhaust stroke. During the exhaust stroke, exhaust gas may be expelled out of the respective combustion chambers towards an exhaust manifold 114. All six cylinders 108, 110 may fire at different intervals and exhaust gas may be expelled in pulses. Alternatively, the engine 102 may be a two-stroke engine where a complete cycle includes a compression/exhaust stroke (BDC to TDC) and a power/exhaust/intake stroke (TDC to BDC).

Further, the engine system 100 includes the exhaust manifold 114 in fluid communication with the engine 102. The exhaust manifold 114 receives exhaust gas from the combustion chambers of the cylinders 108, 110. The exhaust manifold 114 directs exhaust gas towards a turbocharger 116. Specifically, as illustrated in FIG. 1, the engine system 100 includes the turbocharger 116. The turbocharger 116 is disposed downstream of the engine 102. The turbocharger 116 includes a turbine 118 and a compressor 120, which are operatively coupled to each other through a shaft 122. Exhaust gas from the combustion chambers are directed into the turbine 118, which in turn directs exhaust gas toward the atmosphere via a line 124. Further, the compressor 120 ingests fresh air from the atmosphere via a line 126. The turbocharger 116 transfers energy from an exhaust stream of the turbine 118 to an intake stream of the compressor 120, via the shaft 122. Further, the compressor 120 compresses air which is then introduced into the combustion chambers of the cylinders 108, 110 to obtain a pressure boost.

In some examples, the engine system 100 includes an exhaust/aftertreatment module (not shown) that may treat exhaust gas exiting the turbine 118 in order to reduce/remove unwanted gaseous emissions or pollutants, such as nitrogen oxides, particulate matter (such as soot), sulfur oxides, carbon monoxide, unburnt hydrocarbons, and/or other organic compounds from exhaust gas.

Figure 2:
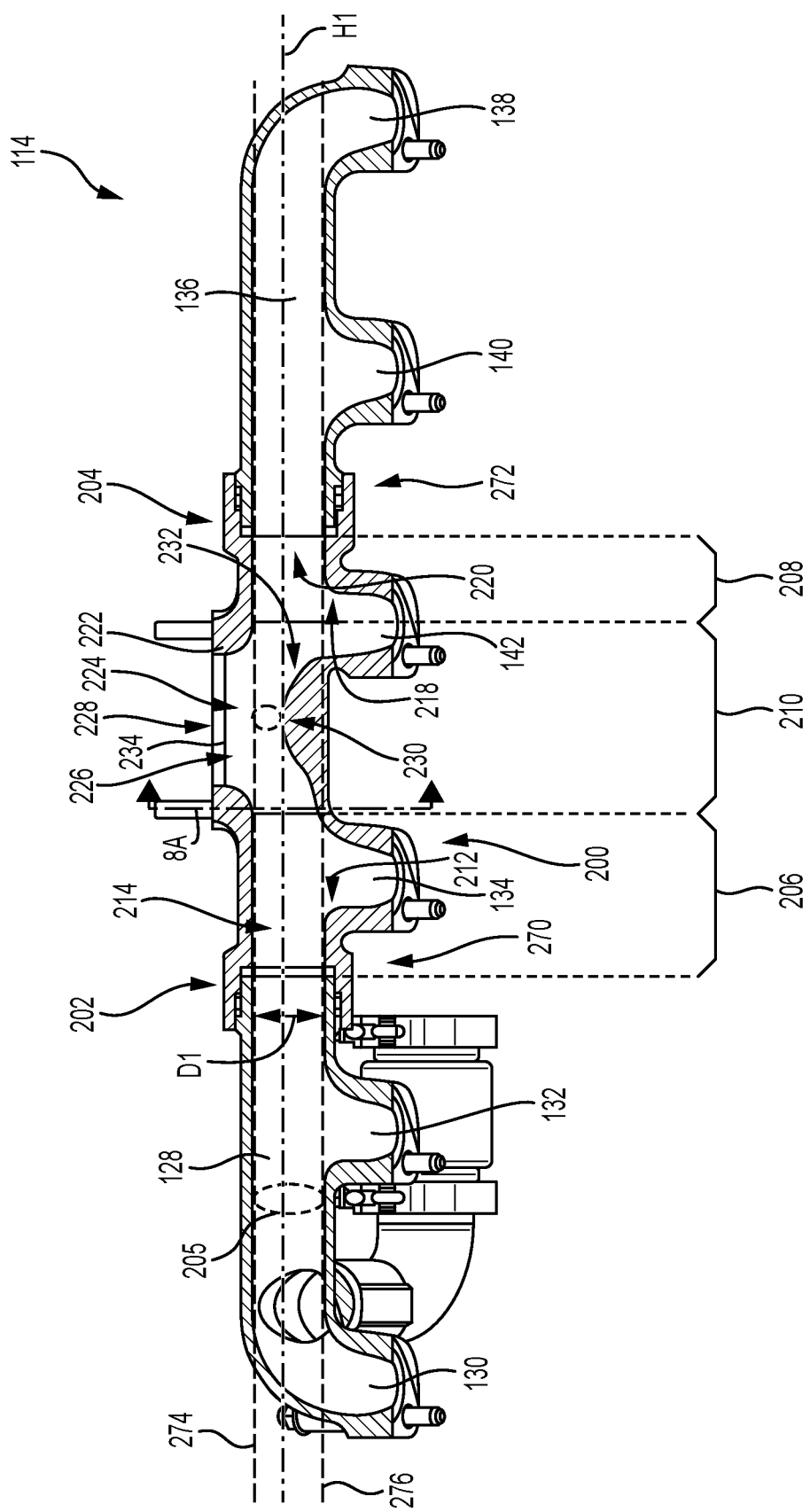
FIG. 2 is a cross-sectional view of an exemplary exhaust manifold of the engine system of FIG. 1, in accordance with aspects of the present disclosure.

Referring now to FIG. 2, the exhaust manifold 114 includes a first manifold portion 128, a second manifold portion 136 spaced from the first manifold portion and an exhaust structure 200 fluidly connecting the first manifold portion and the second manifold portion. As depicted in FIG. 2, the first manifold portion 128, the exhaust structure 200 and the second manifold portion 136 are aligned along horizontal or longitudinal axis H1 of the exhaust manifold 114. As depicted, the exhaust structure 200 has a first interconnecting section 270 at its first end 202 and a second interconnecting section 272 at its second end 204. The first manifold portion 128 is secured into the first interconnecting section 270 of the exhaust structure 200 and the second manifold portion 136 is secured into the second interconnecting section 272 of the exhaust structure 200. Other manners and configurations for connecting the first and second manifold portions 128, 136 to exhaust structure 200 are contemplated.

The first manifold portion 128 is arranged to receive exhaust gas from one or more cylinders 108 (see FIG. 1) of the first set of cylinders 104 (see FIG. 1). The exhaust manifold 114 further includes a number of first branched portions 130, 132, 134 configured as inlet ports or passages into the exhaust manifold. The first branched portions 130, 132, 134 are in fluid communication with combustion chambers of the corresponding cylinders 108 to receive exhaust gas therefrom. Further, the first branched portions 130, 132 may be integral (e.g., integrally formed or monolithically formed) with the first manifold portion 128 and extend angularly from the first manifold portion 128.

The second manifold portion 136 is arranged to receive exhaust gas from one or more cylinders 110 (see FIG. 1) of the second set of cylinders 106 (see FIG. 1). The exhaust manifold 114 further includes a number of second branched portions 138, 140, 142 configured as inlet ports or passages into the exhaust manifold. The second branched portions 138, 140, 142 are in fluid communication with combustion chambers of the corresponding cylinders 110 to receive exhaust gas therefrom. Further, the second branched portions 138, 140 may be integral (e.g., integrally formed or monolithically formed) with the second manifold portion 136 and extend angularly from the second manifold portion 136. The exemplary exhaust manifold 114 shown in FIG. 2 is configured for a six cylinder in-line engine by the inclusion of the three first branched portions 130, 132, 134 and the three second branched portions 138, 140, 142.

The exhaust structure 200 for the exhaust manifold 114 may be assembled with the engine 102 (see FIG. 1) such that the turbocharger 116 (see FIG. 1) is in fluid communication with the exhaust structure 200. The exhaust structure 200 may be arranged to removably connect or secure the exhaust manifold 114 with the turbocharger 116 and may form part of or an entirety of the exhaust manifold 114.

The exhaust structure 200 defines a first end 202 and a second end 204 opposite the first end 202. The exhaust structure 200 is disposed between the first manifold portion 128 and the second manifold portion 136. The first manifold portion 128 is secured to the exhaust structure 200 at the first end 202 of the exhaust structure 200. Further, the second manifold portion 136 is secured to the exhaust structure 200 at the second end 204 of the exhaust structure 200. In other configurations, the first manifold portion 128 and the second manifold portion 136 are part of and integral with the exhaust structure 200.

Figure 3:
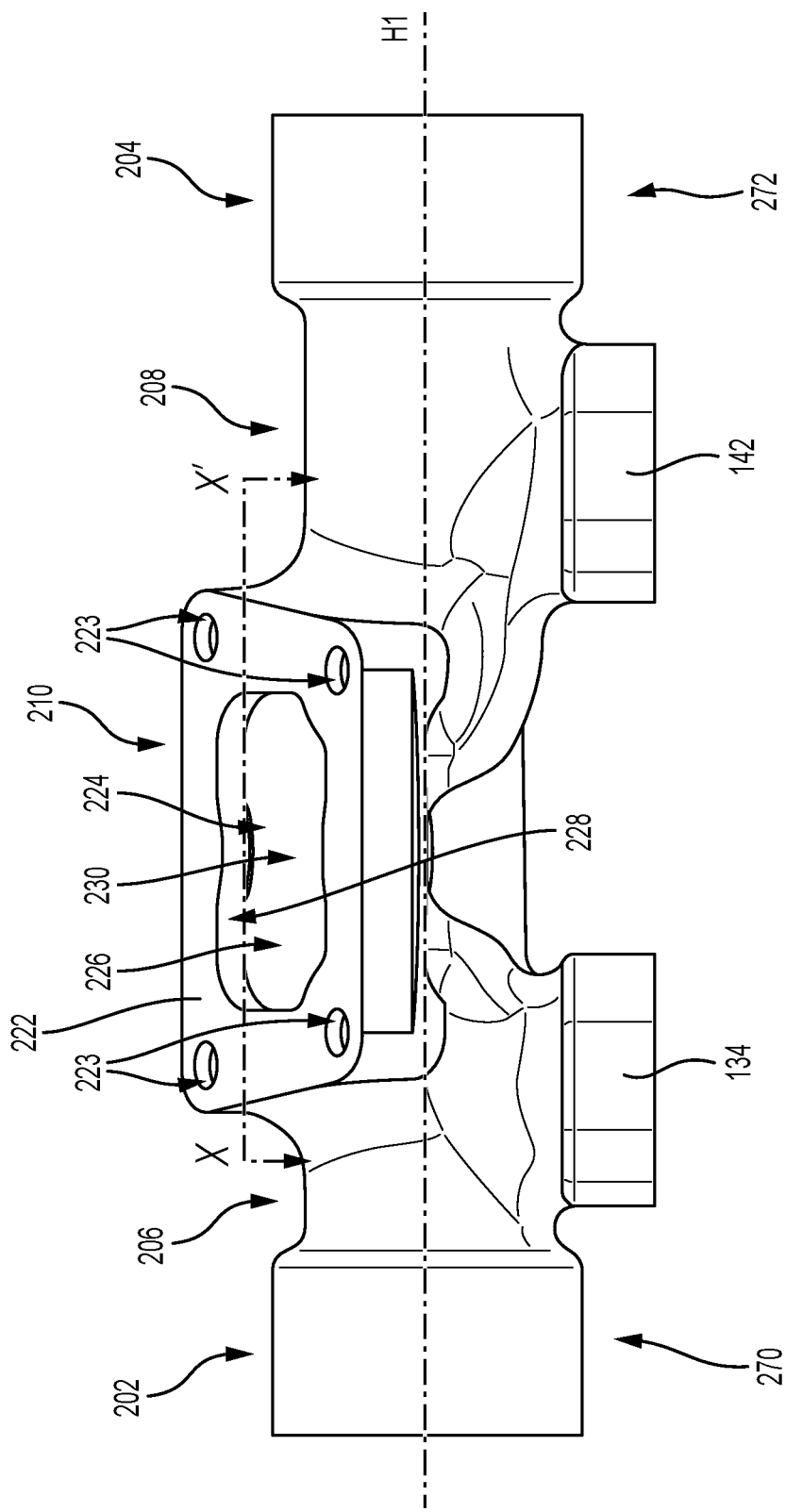
FIG. 3 is a perspective view of an exhaust structure of the exhaust manifold of FIG. 2, in accordance with aspects of the present disclosure.
Figure 4:
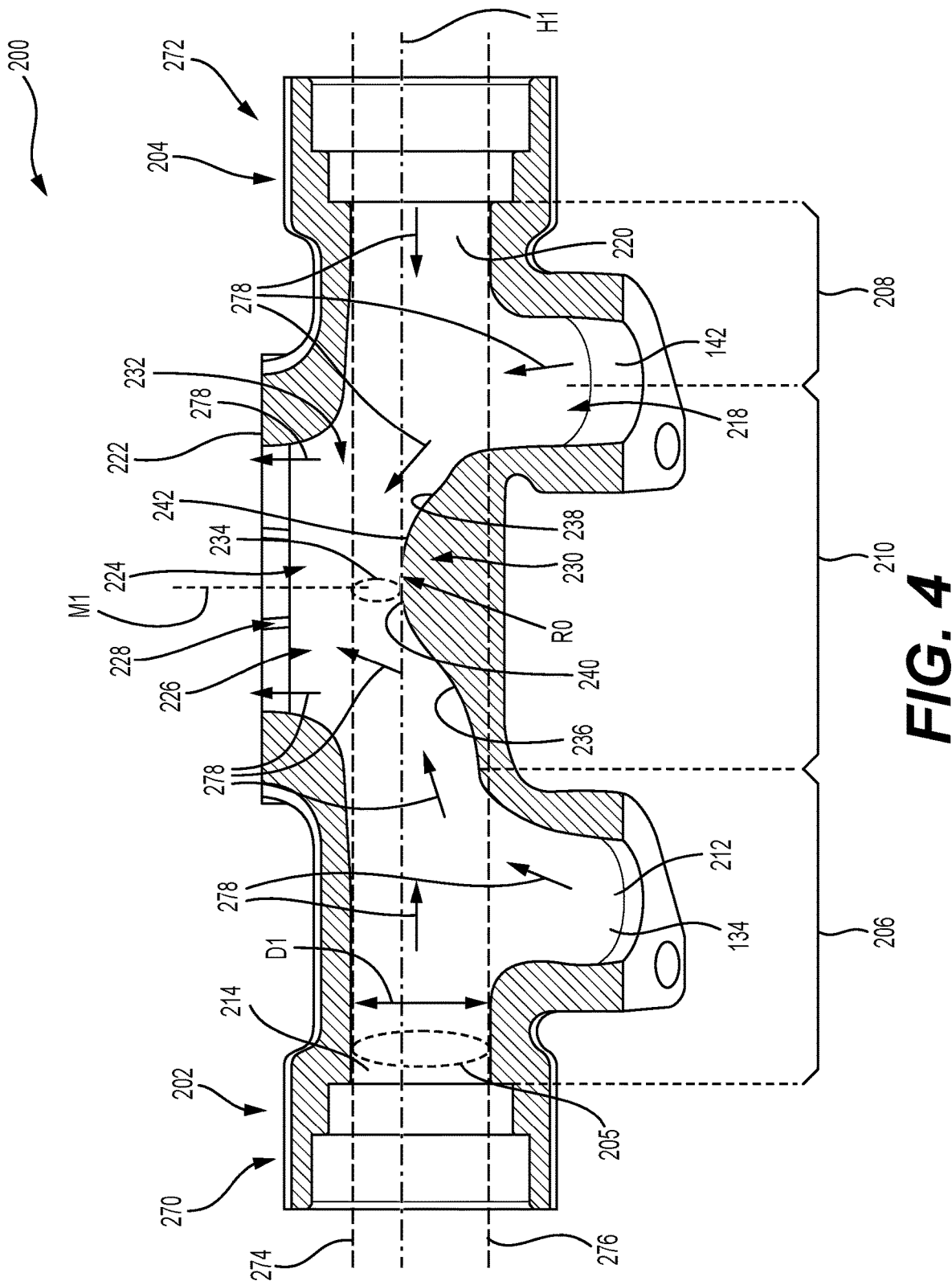
FIG. 4 is a cross-sectional view of the exhaust structure along a line X-X', in accordance with aspects of the present disclosure.

FIG. 3 illustrates a perspective view of the exhaust structure 200. FIG. 4 illustrates a cross-sectional view of the exhaust structure 200 along a line X-X' in FIG. 3. As shown in FIGS. 3 and 4, the exhaust structure 200 includes a first inlet section 206, a second inlet section 208, and a central or intermediate section 210. The first inlet section 206 is integrally formed with and is in fluid communication with the intermediate section 210. Further, the second inlet section 208 is integrally formed with and is in fluid communication with the intermediate section 210. As depicted, the exhaust structure 200 is a one-piece member that may be monolithically formed as a single piece by casting, sintering, additive manufacturing (e.g., 3D printing), or any other desired process.

Referring now to FIG. 4, the exhaust structure 200 includes the first inlet section 206 that extends from the first interconnecting section 270 at the first end 202 of the exhaust structure 200 to the intermediate section 210. The first inlet section 206 defines a first inlet flow passage 214 in fluid communication with some of the first set of cylinders 104 (see FIG. 1) to receive exhaust gas therefrom. Adjacent the first interconnecting section 270, the first inlet flow passage 214 has a standard diameter D1. A normalized cross-sectional area 205 of flow of the exhaust gas may be formed upstream of an exhaust redirection section 230. An upper horizontal dashed line (or horizontal axis) 274 and lower horizontal dashed line (or horizontal axis) 276 in FIG. 4 may extend through circumferentially opposite ends of the first inlet section 206 and second inlet section 208, with distance D1 being the distance between lines 274 and 276. It will be understood by those skilled in the art that the diameter of or distance across the exhaust structure 200 will vary along the length thereof due to various changes in structure including the exhaust inlet ports 212 and 218 as well as the outlet passage 226 and the exhaust redirection section 230. The phrase "normalized cross-sectional area" refers to the cross-sectional area measured at the standard diameter D1. It should be noted that the upper horizontal dashed line 274 and the lower horizontal dashed line 276 are also depicted in FIG. 2 to show that portions of the first manifold portion 128 and the second manifold portion 136 may also have the same standard diameter D1 and thus the same normalized cross-sectional area 205 through which exhaust gas flows.

The exhaust structure 200 defines a first inlet flow passage 214 along the horizontal axis H1 of the exhaust structure 200. The exhaust structure 200 further defines a first exhaust inlet passage or inlet port 212 disposed at an angle to (e.g., not aligned with) the horizontal axis H1. The first inlet flow passage 214 is arranged to receive exhaust gas from the first manifold portion 128 and is in fluid communication with the first manifold portion (see FIG. 2). Exhaust gas from the first exhaust inlet port 212 also fluidly communicates with and enters the first inlet section 206 to combine with the exhaust gas entering through the first inlet flow passage 214. It should be noted that, in the example illustrated in FIG. 4, the first branched portion 134 (i.e., first exhaust inlet port 212) is integral (e.g., integrally formed or monolithically formed) with the exhaust structure 200 and extends angularly therefrom. Thus, the first inlet section 206 receives exhaust gas from each of the first branched portions 130, 132, 134 (FIG. 2).

The exhaust structure 200 also includes the second inlet section 208 arranged at the second, opposite end 204 of the exhaust structure 200. The second inlet section 208 defines a second inlet flow passage 220 in fluid communication with some of the second set of cylinders 106 (see FIG. 1) to receive exhaust gas therefrom. The second inlet flow passage 220 also has the standard diameter D1 defining the normalized cross-sectional area 205 of flow adjacent the second interconnecting section 272. It should be noted that, as depicted, a portion of the flow passage of the first manifold portion 128, a portion of the first inlet flow passage 214, a portion of the second inlet flow passage 220, and a portion of the second manifold portion 136 (FIG. 2) each have same diameter. Thus, the term "standard diameter" as used in this disclosure refers to a diameter that is common (e.g., equivalent or approximately equivalent) across at least a portion of two or more of: a flow passage of the first manifold portion 128, the first inlet flow passage 214, the second inlet flow passage 220, or a flow passage of the second manifold portion 136. The standard diameter is measured between a pair of inlets (in the example of FIG. 2, measured between branched portions). The use of the term "diameter" does not require a circular cross section and may instead correspond to the greatest width of a non-circular cross-sectional area through which exhaust flows through the first manifold portion 128, the first inlet flow passage 214, the second inlet flow passage 220, or the second manifold portion 136.

The exhaust structure 200 defines a second exhaust inlet passage or exhaust inlet port 218 disposed at an angle to the horizontal axis H1. The second inlet flow passage 220 is arranged to receive exhaust gas from the second manifold portion 136 and is in fluid communication with the second manifold portion. Exhaust gas from the second exhaust inlet port 218 fluidly communicates with and enters the second inlet section 208 to combine with exhaust gas entering through the second inlet flow passage 220. It should be noted that, in the example of FIG. 4, the second branched portion 142 (i.e., second exhaust inlet port 218) is integral with the exhaust structure 200 and extends angularly therefrom. Thus, the second inlet section 208 receives exhaust gas from each second branched portion 138, 140, 142 (see FIG. 2).

The exhaust structure 200 further includes the intermediate section 210 disposed between the first inlet section 206 and the second inlet section 208. The intermediate section 210 is in fluid communication with each of the first inlet section 206 and the second inlet section 208.

As shown in FIG. 3, the intermediate section 210 includes a flange 222. The flange 222 is arranged to removably connect or secure the intermediate section 210 of the exhaust structure 200 and the other components of exhaust manifold 114 with the turbocharger 116 (FIG. 1) associated with the engine 102 (FIG. 1). Thus, the turbocharger 116 is secured to the exhaust structure 200 at the flange 222 of the intermediate section 210. The flange 222 includes a number of holes 223 for receiving fasteners (not shown), such as bolts, studs to connect or secure the exhaust structure 200 with the turbocharger 116.

Referring again to FIG. 4, the intermediate section 210 includes an outlet section 224 defining an outlet flow passage 226 extending through the flange 222 that is in fluid communication with each of the first inlet flow passage 214 and the second inlet flow passage 220. The outlet flow passage 226 includes an opening 228 through the flange 222 through which exhaust gas from both the first inlet section 206 and the second inlet section 208 exits the exhaust structure 200. Further, as depicted, the outlet flow passage 226 includes only a single opening 228 through the flange 222 through which exhaust gas from both the first inlet section 206 and the second inlet section 208 exits the exhaust structure 200. This opening 228 at flange 222 is formed without a dividing wall that isolates opposite sides of the opening 228. Flow of exhaust gas through the exhaust structure 200 is represented by arrows 278 in FIG. 4.

The intermediate section 210 further includes the exhaust redirection section 230 disposed between the first inlet section 206 and the second inlet section 208. The exhaust redirection section 230 defines a redirection flow passage 232 adjacent the outlet section 224. The redirection flow passage 232 defines a restricted redirection cross-sectional area 234 (or more simply "redirection cross-sectional area") of flow. The redirection cross-sectional area 234 is also referred to herein as a reduced cross-sectional flow path, as area 234 may restrict the free flow of exhaust in a direction toward the intermediate section 210 from the first inlet section 206 or the second inlet section 208.

The redirection cross-sectional area 234 of flow (or "reduced cross-sectional flow path"), as measured at a midpoint M1 along a width of the flange 222 upstream of the opening 228, is less than the normalized cross-sectional area 205 of flow of the first inlet flow passage 211. In some examples, the redirection cross-sectional area 234 of flow measured at the midpoint M1 of the flange 222 is between about 5% and about 35%, or in particular between about 20% and about 30% of the normalized cross-sectional area 205 of flow of the first inlet flow passage 211. In some examples, restriction within this range may result in improved performance and greater exhaust redirection towards the flange 222. In some examples, the redirection cross-sectional area 234 of flow measured at the midpoint M1 of the flange 222 may be limited to about 25% of the normalized cross-sectional area 205 of flow of the first inlet flow passage 211. Due to this structure, about 95% to about 65%, or about 80% to about 70%, of linear flow through cross-sectional area 205 is redirected away from the opposite side of the exhaust structure 200 by the redirection section 230.

The exhaust redirection section 230 may be embodied as a raised wall that protrudes in a direction toward the opening 228. The exhaust redirection section 230 includes a first portion 236. The exhaust redirection section 230 also includes a second portion 238 spaced apart from the first portion 236. In some examples, each of the first and second portions 236, 238 may include a curved surface. It should be noted that the present disclosure is not limited by a shape/profile of the first and second portions 236, 238. Accordingly, the first portion 236 may have any shape/profile that may allow exhaust gas to be diverted from the first inlet section 206 towards the opening 228. Similarly, the second portion 238 may have any shape/profile that may allow exhaust gas to be diverted from the second inlet section 208 towards the opening 228.

The exhaust redirection section 230 further includes an intermediate portion 240 extending between the first portion 236 and the second portion 238. The intermediate portion 240 extends between and connects the first portion 236 with the second portion 238. The intermediate portion 240 is arranged to face the outlet section 224. The intermediate portion 240 includes a curved surface 242. As depicted, the curve of intermediate portion 240 curves in a direction opposite of the curves of the first and second portions 236, 238, such that the first and second portions 236, 238 are asymmetrical with respect to each other. More specifically, the intermediate portion 240 curves downward (e.g., forms a convex surface when viewed in cross-section) while the first and second portions 236, 238 curve upward (e.g., forming a concave surface when viewed in cross-section). Further, the curved surface 242 of the intermediate portion 240 defines a radius R0 that is approximately 50% of the standard diameter D1 of the first inlet flow passage 211.

In other embodiments, the first and second portions 236, 238 may be configured as sloped surfaces, such as a flat inclined surface. In some embodiments, the intermediate portion 240 may include sloped surfaces rather than a curved surface.

It should be noted that the intermediate portion 240 may be aligned with the midpoint M1 of the flange and is spaced from and terminates below the flange 222. Overall, the exhaust redirection section 230 may have an approximately inverted U-shaped or "humped" design. As depicted in FIG. 4, the space between the upper surface of the exhaust redirection section 230 and the upper surface of the flange 222 is formed in part by the restricted redirection cross-sectional area 234 of flow and in part by the outlet flow passage 226. More specifically, the restricted redirection cross-sectional area 234 of flow is bounded on the bottom by the upper surface of the exhaust redirection section 230 and on the top by the upper horizontal dashed line 274, upper horizontal dashed line 274 corresponding to end surfaces of first inlet section 206 and second inlet section 208. The outlet flow passage 226 is bounded on the bottom by the upper horizontal dashed line 274 and on the top by the upper surface of the flange 222.

Figure 5:
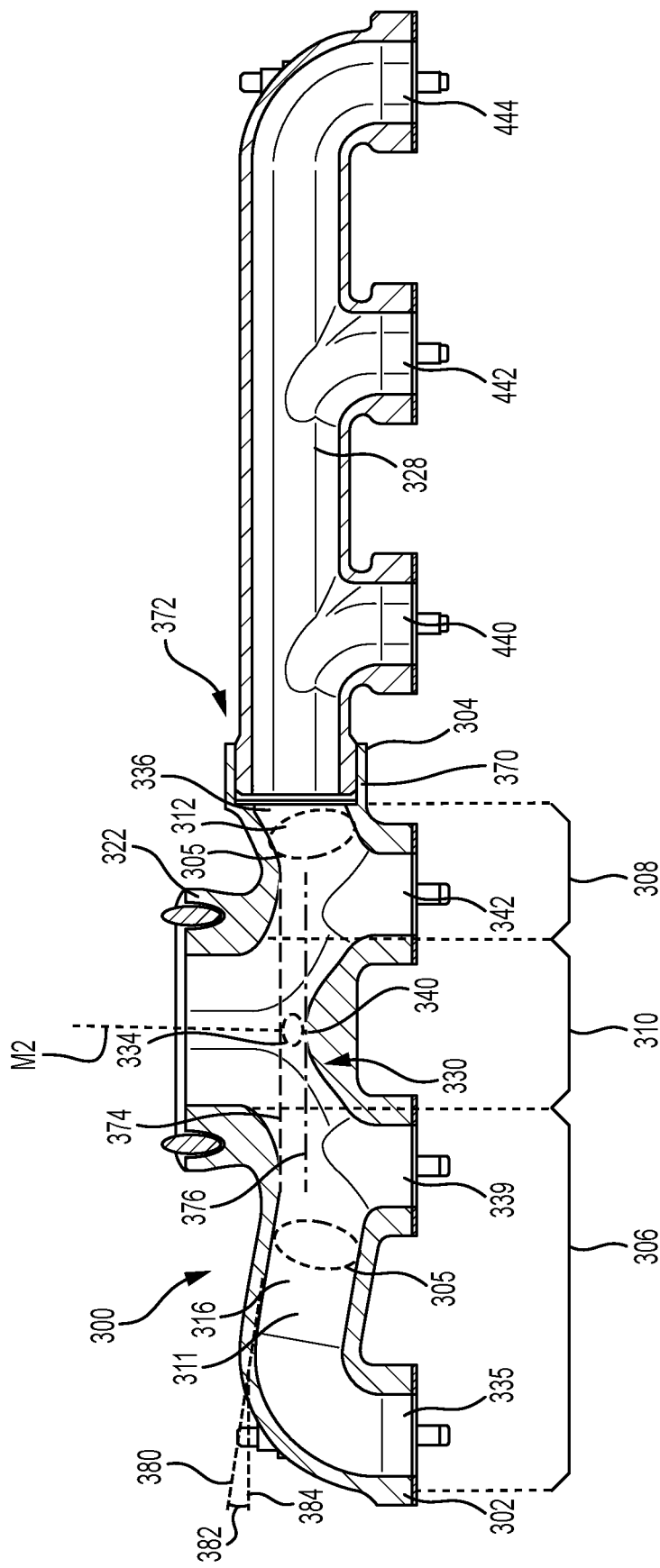
FIG. 5 is a cross-sectional view of another example of an exhaust manifold, including an exhaust structure, of the engine system of FIG. 1.

FIG. 5 illustrates a cross-section of an exhaust structure 300 according to aspects of the present disclosure. Exhaust structure 300 may have structures that are similar to those of the exhaust structure 200, but includes curvature that places a first manifold portion 316 and a second manifold portion 336 at an angle 382 with respect to an axial direction. Additionally, the exhaust structure 300 may include curvature in an exhaust redirection section 330 that reduces hot spots within the exhaust structure 300, as described below.

The exhaust structure 300 may extend from a first end 302 to a second end 370, the second end 370 being included in an interconnecting section 372. The exhaust structure 300 may include a first inlet section 306, a second inlet section 308, and a central or intermediate section 310 between the first and second inlet portions 306 and 308. The first inlet section 306 includes one or a plurality of first branched portions, or inlets, for receiving exhaust from an engine, a first branched portion 335 and a first branched portion 339 being show in FIG. 5. The second inlet section 308 includes one or a plurality of second branched portions, or inlets, for receiving exhaust from an engine, a single second branched portion 342 being shown. While the number of branched portions and inlets of the structure 300, and exhaust manifold as a whole, is unevenly distributed about the flange 322 in FIG. 5, if desired, the flange 322 may be located in the center of exhaust structure 300 and/or at the center of the exhaust manifold, such that the number of inlets on each side of the flange 322 are equal to each other.

The exhaust structure 300 may be part of an exhaust manifold and may connect to a second manifold portion 328 of the exhaust manifold at the interconnecting section 372 that includes one or more branched portions or exhaust inlets, second branched portions 440, 442, and 444 being shown in FIG. 5. As shown in FIG. 5, the first manifold portion 316 does not include an interconnecting section. However, if desired, one or both sides of exhaust structure 300 may include an interconnecting section 372 for connection to a section of the exhaust manifold that includes one or more second branched portions (three second branched portions 440, 442, and 444 shown in FIG. 5). The first and second branched portions may be similar as the first and second branched portions described above with respect to FIGS. 1-4.

Like the exhaust structure 200, exhaust structure 300 may include an exhaust redirection section 330. An intermediate or central portion 340 may form a ridge of redirection section 330. In some aspects, exhaust redirection section 330 acts as a stopper or guide for exhaust within structure 300. The exhaust redirection section 330 may include a restricted cross-sectional area 334 that facilities redirection of exhaust in a direction towards the opening of the flange 322, preventing most or all exhaust from traveling from passage 311 to a second inlet flow passage 312.

The restricted redirection cross-sectional area 334 may be smaller than the restricted cross-sectional area 234 of the exhaust structure 200. For example, the cross-sectional area 334 may be between about 5% and about 30%, or about 10%, of the normalized cross-sectional area 305, such that about 95% to about 70% of linear flow through cross-sectional area 305 is redirected away from the opposite side of the exhaust structure 300 by the redirection section 330.

Upper and lower boundaries of the redirection cross-sectional area 334 may be defined by an upper horizontal line (or horizontal axis) 374 and a lower horizontal line (or horizontal axis) 376, shown in FIG. 5. The upper horizontal line 374 may extend through an upper circumferential end of first inlet flow passage 311. The lower horizontal line 376 may extend through a peak of central portion 340 which forms the ridge of redirection section 330 protruding towards the opening of the flange 322.

As shown in FIG. 5, a pair of walls may extend from an interior end of the flange 322 in an angled or curved manner. In the illustrated example, the first manifold portion 316 includes a wall that forms an inner wall axis 380. The inner wall axis 380 may extend along an inner wall of the first inlet flow passage 311 in a direction that is obliquely angled with respect to a midline M2 that passes through a center of the opening of the flange 322, assisting in reduction of hot spots created by the flow of exhaust. The inner wall axis 380 may also extend obliquely with respect to a length direction along which branched portions 335, 339, and 342 are spaced apart from each other, a horizontal line 384 in FIG. 5 being parallel to the length direction. The angle 382 between inner wall axis 380 and horizontal line 384 corresponds to the inclination of the first inlet flow passage 311 and may be about 5 degrees to about 40 degrees. An angle with the same inclination may be formed by the inner wall on the opposite side of the flange 322 (e.g., at the second inlet flow passage 312) in 336. As shown in FIG. 5, the inner wall axis 380 may also define one bound of a normalized cross-sectional area 305, an opposite wall of the first inlet flow passage 311 defining the opposite bound of the normalized cross-sectional area 305.

Exhaust redirection section 330 may be positioned between the first manifold portion 316 and the second manifold portion the second manifold portion 336. The exhaust redirection section 330 is, for example, partially or entirely within the intermediate section 310. In the embodiment illustrated in FIGS. 5-7D and 8B, exhaust redirection section 330 has curved walls that have an increased thickness, shorter curve lengths, and more gradual curves (e.g., increased radii of curvature), as compared with the configuration of FIGS. 2-4.

Figure 6:
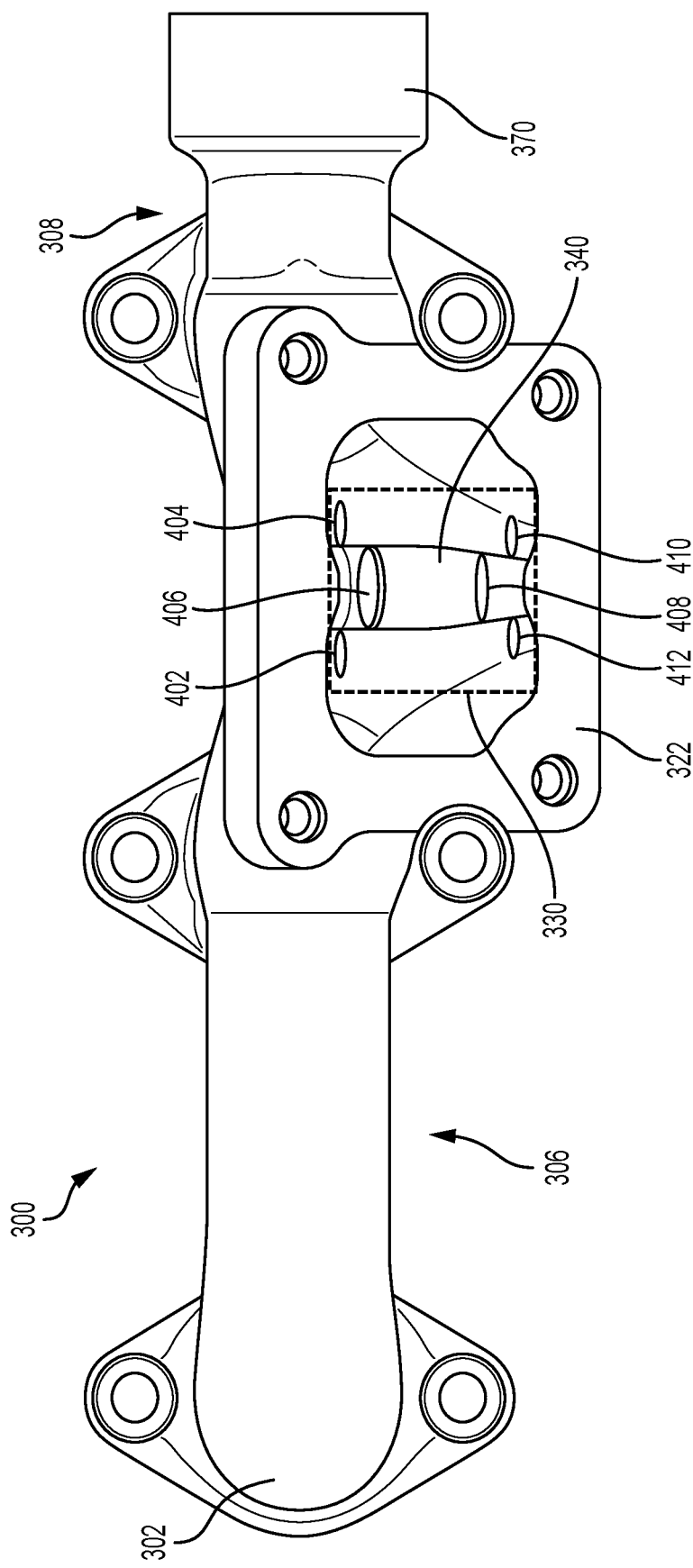
FIG. 6 is a perspective view of the exhaust structure of FIG. 5.

FIG. 6 illustrates a perspective view of the exhaust structure 300 showing the exhaust redirection section 330 below the flange 322. The exhaust redirection section 330 may be generally symmetrical about central portion 340. In other configurations, exhaust redirection section 330 may be asymmetrical. The exhaust redirection section 330 of the structure 300 may include a plurality of curved portions, six curved portions 402, 404, 406, 408, 410, and 412 being shown in FIG. 6. FIGS. 7A-7D are cross-sectional views illustrating wall thickness, curve length, and radii of curvature for portions 402-412.

Figure 7A:
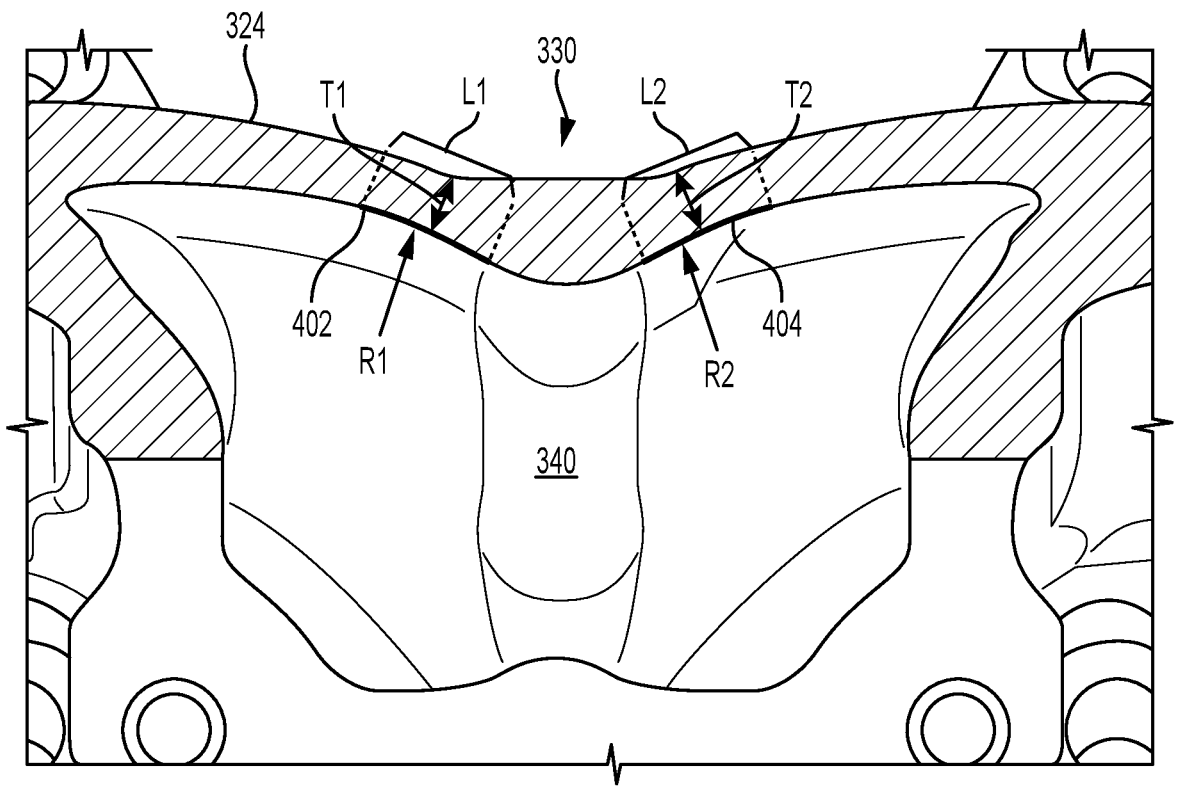
FIG. 7A-7D are cross-sectional views of the exhaust structure of FIG. 5.

FIG. 7A is a cross-sectional view of the exhaust structure 300 showing portions 402 and 404. Portions 402 and 404 may be located on opposite sides of the ridge or central portion 340.

Figure 7B:
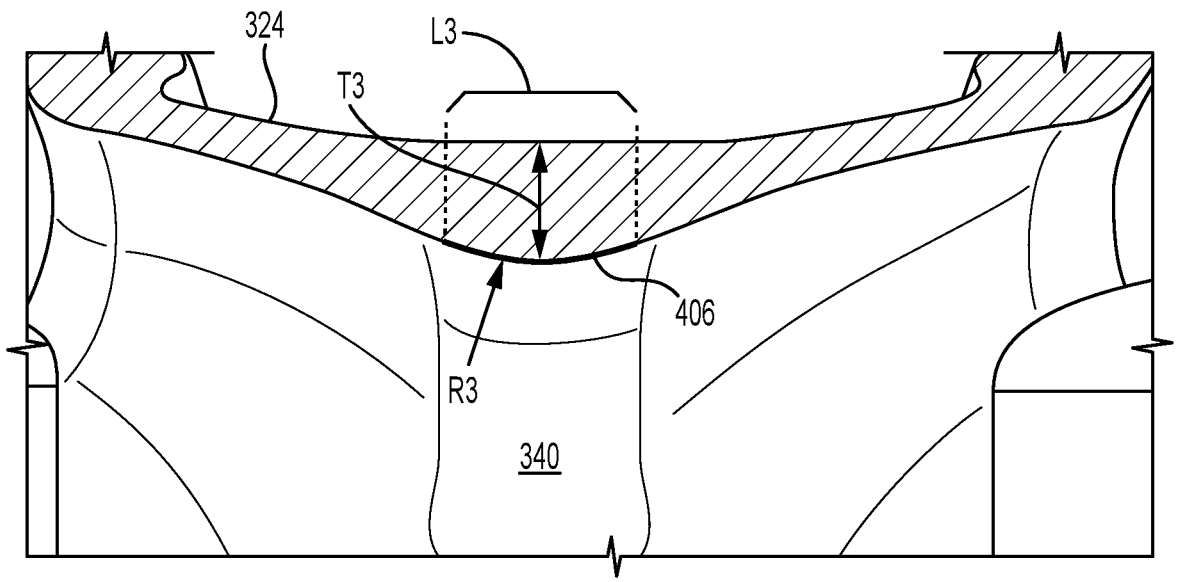

FIG. 7B is a cross-sectional view of the exhaust structure 300 showing portion 406. Portion 406 may be located at central portion 340, at a ridge that extends portions 402 and portions 404.

Figure 7C:
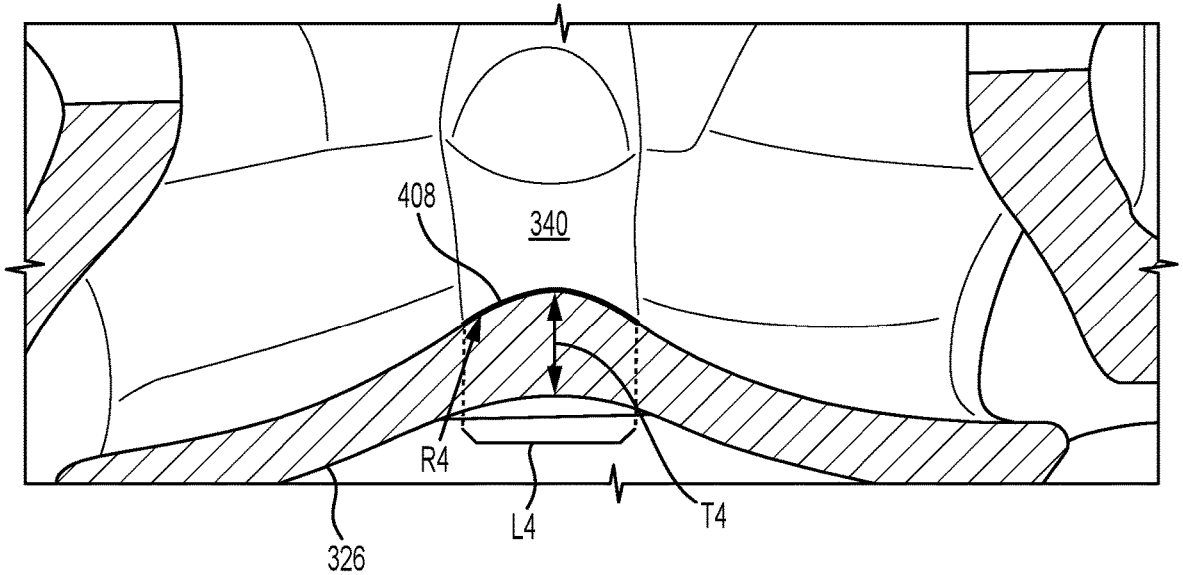

FIG. 7C is a cross-sectional view of the exhaust structure 300 showing portion 408. Portion 408 may also be located at central portion 340.

Figure 7D:
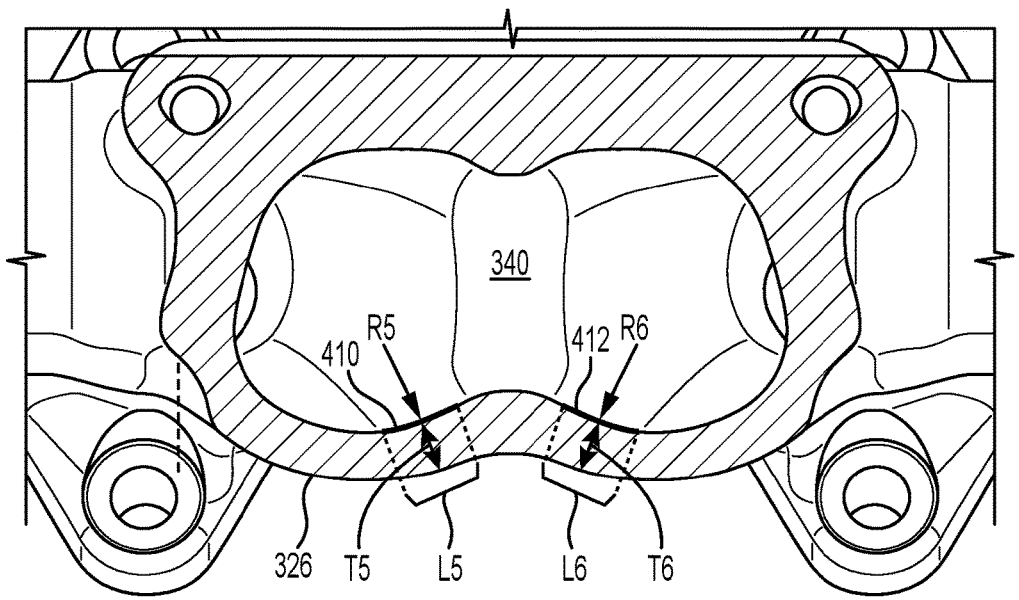

FIG. 7D is a cross-sectional view of the exhaust structure 300 showing portions 410 and 412. Portions 410 and 412 may be located on opposite sides of the central portion 340.

As shown in FIG. 6, portions 408, 410, and 412 may be located on an opposite side of the flange 322 as compared to portions 402, 404, and 406.

FIG. 7A illustrates portions 402 and 404, which have thickness T1, length L1, and radius of curvature R1, and a thickness T2, length L2, and radius of curvature R2, respectively. In some aspects, thicknesses T1 and T2 may have equivalent values, lengths L1 and L2 may have equivalent values, and radii R1 and R2 may have equivalent values. In at least some embodiments, one or more of thicknesses T1 and T2, lengths L1 and L2, or radii R1 and R2 may have different values. For example, length L1 may be longer than lengths L2 and radius R1 may be smaller than radius R2.

As described herein, the length of a curve corresponds to the length of a curved surface that has a constant or approximately constant radius of curvature. Lengths L1 and L2 may be lengths of, for example, about 10 mm to about 30 mm or about 15 mm to about 25 mm. Radii R1 and R2 may be about 20 mm to about 70 mm, or about 35 mm to about 60 mm. Radius R1 may be shorter than radius R2. Thickness T1 and thickness T2 may be greater than a thickness of a laterally outward portions of a wall 324, and less than a thickness of wall 324 between portions 402 and 404 (e.g., thickness T3; FIG. 7B). Thickness T1 and T2 may change along the lengths L1 and L2, respectively with the maximum value of thicknesses T1 and T2 being at the intersection of portions 402 and 404 with the central portion 340.

FIG. 7B is a cross-section of exhaust structure taken lower (farther from the flange 322) as compared to the cross-section of FIG. 7A. FIG. 7B illustrates portion 406, which has thickness T3, length L3, and radius of curvature R3. Length L3 may have a value of, for example, about 5 mm to about 45 mm, or about 15 mm to about 35 mm. Radius R3 may have a value of, for example, about 3 mm to about 18 mm, or about 7 mm to about 15 mm. Thickness T3 may be larger than T1 and T2, as described above.

FIG. 7C illustrates portion 408, which has thickness T4, length L4, and radius of curvature R4. Length L4 may have a value of, for example, about 10 mm to about 40 mm, or about 15 mm to about 35 mm. Radius R4 may have a value of, for example, about 1 mm to about 20 mm, or about 4 mm to about 15 mm. Thickness T4 may be larger than the thicknesses of portions of a wall 326 positioned laterally outward and continuous with portion 408, with the maximum value of thickness T4 being at the center of portion 406.

FIG. 7D is a cross-section of exhaust structure taken higher (closer to the flange 322) as compared to the cross-section of FIG. 7C. FIG. 7D illustrates portions 410 and 412, which have thickness T5, length L5, and radius of curvature R5, and a thickness T6, length L6, and radius of curvature R6, respectively. In some aspects, thicknesses T5 and T6 may have equivalent values, lengths L5 and L6 may have equivalent values, and radii R5 and R6 may have equivalent values. In at least some embodiments, one or more of thickness T5 and T6, lengths L5 and L6, or radii R5 and R6 may have different values. For example, length L5 may be longer than length L6 and radius R5 may be smaller than radius R6.

Lengths L5 and L6 may have values of, for example, about 5 mm to about 20 mm or about 10 mm to about 15 mm. Radii R5 and R6 may have values of, for example, about 5 mm to about 40 mm or about 10 mm to about 30 mm. Radius R5 may be shorter than radius R6. Thickness T5 and thickness T6 may be greater than a thickness of laterally outward portions of the wall 326, and less than a thickness of wall 326 between portions 410 and 412 (e.g., thickness T4; FIG. 7C).

Figure 8A:
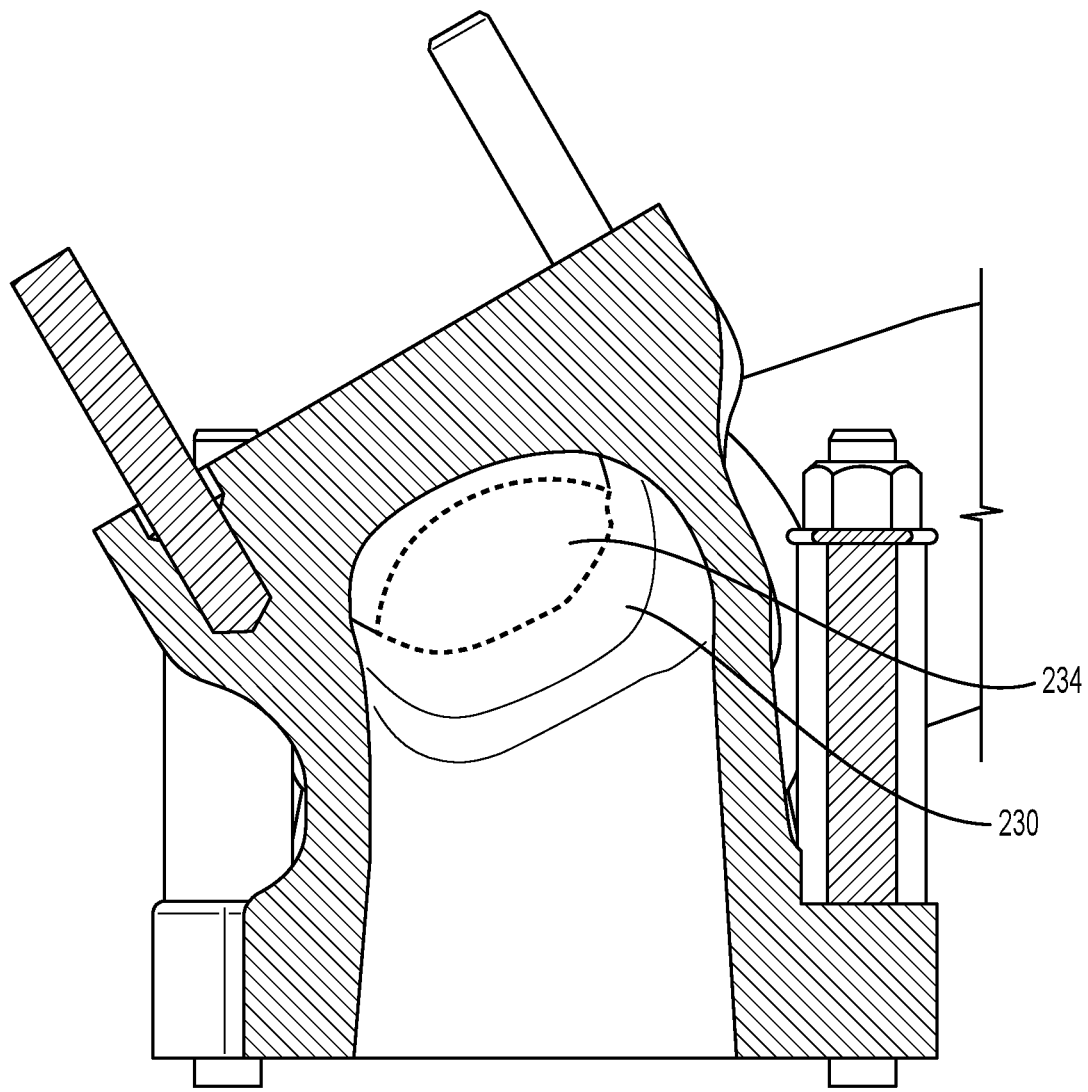
FIG. 8A is a cross-sectional side view of the exhaust structure of FIG. 2.
Figure 8B:
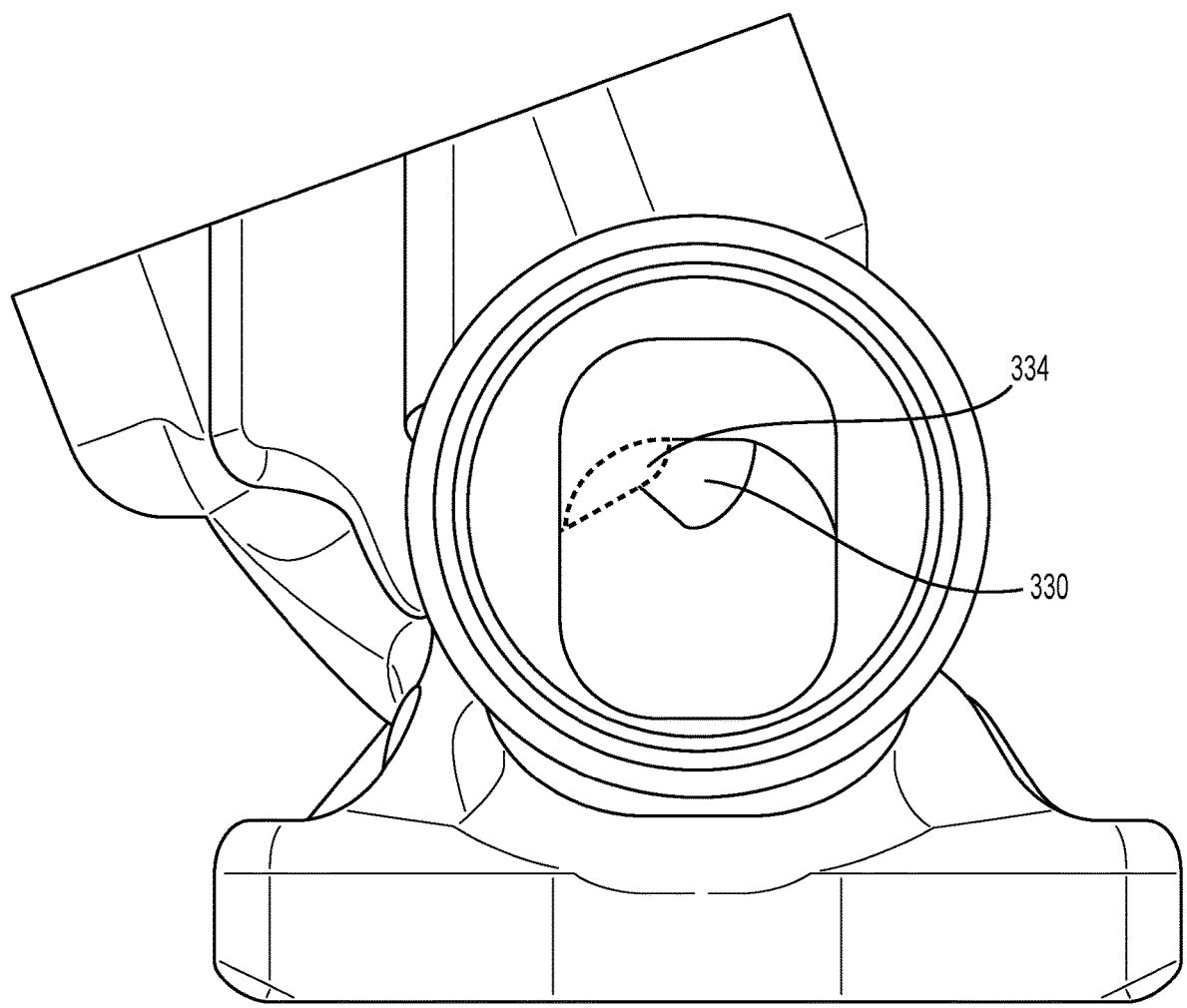
FIG. 8B is a side view of the exhaust structure of FIG. 5.

FIG. 8A illustrates a cross-sectional side view along line 8A in FIG. 2 of the exhaust structure 200 of FIG. 2, with the periphery of the restricted cross-sectional area 234 being represented in dashed lining. As can be seen in FIG. 8A, the reduced flow path of area 234 is defined partially by exhaust redirection section 230. FIG. 8B illustrates a side view of the exhaust structure 300 of FIG. 5, showing a restricted cross-sectional area 334 formed in part by exhaust redirection section 330.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to exhaust structures 200 and 300 for an exhaust manifold. The exhaust structure 200, for example, includes the exhaust redirection section 230 that diverts exhaust gas flowing through each of the first and second inlet sections 206, 208 upward towards the outlet flow passage 226 and thus, to a significant or material extent, away from each other. Further, the exhaust redirection section 230 reduces that extent to which exhaust gas in the first inlet section 206 may enter the second inlet section 208, and vice versa. More specifically, as engine 100 operates, the cylinders will combust at different times creating pulses of exhaust gas that flow into the exhaust manifold. Since the pulses of exhaust gas from first inlet section 206 is flowing in an opposite direction and with somewhat different timing from the exhaust gas of the second inlet section 208, absent the exhaust redirection section 230, the exhaust gas from each of the first inlet section 206 and the second inlet section 208 may undesirably tend to flow into the other inlet section. The exhaust redirection section 230 is configured to redirect the exhaust gas flowing through the first and second inlet sections 206, 208 so that less exhaust gas flowing from one section flows towards the other end 202, 204 of the exhaust structure 200. The schematic flow of exhaust gas is depicted in FIG. 4 by arrows 278. The exhaust structure 300 may, in a similar manner, receive and divert exhaust gas and prevent pulses of exhaust gas from traveling from one side of the exhaust structure to the other.

Further, the exhaust redirection sections of the exhaust structure 200 and the exhaust structure 300 act as a diverter or guiding feature that diverts exhaust gas from first inlet sections and the second inlet sections towards the outlet of the intermediate section. The exhaust redirection sections 230 and 330 also ensure a smooth entry of exhaust gas into the turbocharger 116. Moreover, the incorporation of the exhaust redirection section 230, 330 may reduce a susceptibility of reverse flow of exhaust gas and may therefore prevent generation of back pressure. The exhaust redirection section 230, 330 may also reduce turbulence within the exhaust structures 200, 300 and/or at an entry of the turbocharger 116. Further, the exhaust structures 200, 300 described herein may permit the use of relatively simple exhaust structure that includes a single-wide opening (e.g., the single opening 228), without affecting an efficiency/performance of the VTG turbocharger.

Further, the exhaust structure 300 may, in addition to redirecting flow, include structures that prevent the formation of hot spots. Areas of curvature in the exhaust redirection section and/or around a ridge of the redirection section may increase heat dissipation rates and facilitate even heating and cooling. In particular, curved portions may be present in the exhaust redirection section 330, the curves generally having reduced lengths with increased radii of curvature, pushing the redirection section 330 farther out into a flow path of exhaust, increasing the amount of exhaust that is redirected and guiding the exhaust in a manner that prevents thermal wear. Further, a two-piece design with a single slip joint at interconnecting section 372, for example, may reduce the number of components and reduce exhaust leakage.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

The general description and the detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "generally," and "approximately" are used to indicate a possible variation of ±10% in the stated value or characteristic.

What is claimed is:

1. An exhaust structure for an exhaust manifold associated with an engine, the exhaust structure comprising:
    a first inlet section arranged at a first end of the exhaust structure, wherein the first inlet section defines a first inlet flow passage configured to receive exhaust gas, the first inlet flow passage defining a normalized cross-sectional area of flow;
    a second inlet section arranged at a second, opposite end of the exhaust structure, the second inlet section defining a second inlet flow passage configured to receive exhaust gas, the second inlet flow passage defining the normalized cross-sectional area of flow; and
    an intermediate section disposed between the first inlet section and the second inlet section and in fluid communication with each of the first inlet section and the second inlet section, the intermediate section including:
        a flange;
        an outlet section defining an outlet flow passage extending through the flange, the outlet flow passage being in fluid communication with each of the first inlet flow passage and the second inlet flow passage and including a flange opening extending through the flange; and
        an exhaust redirection section disposed between the first inlet section and the second inlet section, the exhaust redirection section having a reduced cross-sectional area of flow, forming a flow opening through which exhaust is configured to flow, the reduced cross-sectional area of flow being measured at a midpoint along a length of the flange that is less than the normalized cross-sectional area of flow of the first inlet flow passage.

2. The exhaust structure of claim 1, wherein the reduced cross-sectional area of flow, measured at the midpoint of the flange, is between about 5% and about 35% of the normalized cross-sectional area of flow of the first inlet flow passage.

3. The exhaust structure of claim 1, wherein the exhaust redirection section includes:
    a first portion;
    a second portion spaced from the first portion; and
    an intermediate portion extending between the first portion and the second portion, wherein the intermediate portion is arranged to face the outlet section, and wherein the intermediate portion includes a curved surface.

4. The exhaust structure of claim 3, wherein the curved surface of the intermediate portion defines a radius that is approximately 50% of a standard diameter defined by the first inlet flow passage.

5. The exhaust structure of claim 1, wherein the exhaust structure defines:
    a first inlet flow passage;
    a first exhaust inlet port disposed at an angle to a horizontal axis, wherein the outlet flow passage is configured to receive exhaust gas from each of the first inlet flow passage and the first exhaust inlet port;
    a second inlet flow passage; and
    a second exhaust inlet port disposed at an angle to the horizontal axis, wherein the outlet flow passage is further configured to receive exhaust gas via each of the second inlet flow passage and the second exhaust inlet port.

6. The exhaust structure of claim 1, wherein the flange opening is a single opening through the flange through which exhaust gas from both the first inlet section and the second inlet section exits the exhaust structure.

7. The exhaust structure of claim 1, wherein the flange is arranged to removably secure the intermediate section of the exhaust structure with a turbocharger associated with the engine.

8. An exhaust manifold for an engine, the exhaust manifold comprising:
    an exhaust structure including:
        a first inlet section arranged at a first side of the exhaust structure, wherein the first inlet section defines a first inlet flow passage in fluid communication with a first set of cylinders of the engine to receive exhaust gas therefrom, the first inlet flow passage having a diameter defining a normalized cross-sectional area of flow;
        a second inlet section arranged at a second side of the exhaust structure, wherein the second inlet section defines a second inlet flow passage in fluid communication with a second set of cylinders of the engine to receive exhaust gas therefrom, the second inlet flow passage having the diameter defining the normalized cross-sectional area of flow; and
        an intermediate section disposed between the first inlet section and the second inlet section and in fluid communication with each of the first inlet section and the second inlet section, the intermediate section including:
            a flange;

an outlet section defining an outlet flow passage extending through the flange that is in fluid communication with each of the first inlet flow passage and the second inlet flow passage, the outlet flow passage including a single opening through the flange through which exhaust gas from both the first inlet section and the second inlet section exits the exhaust structure; and an exhaust redirection section disposed between the first inlet section and the second inlet section, the exhaust redirection section defining a redirection flow passage adjacent the outlet section, the redirection flow passage defining a redirection cross-sectional area of flow, the redirection cross-sectional area of flow, measured at a midpoint of the flange, being less than the normalized cross-sectional area of flow of the first inlet flow passage; and a manifold portion secured to the exhaust structure at the second side of the exhaust structure, wherein the manifold portion is arranged to receive exhaust gas from at least one cylinder of the second set of cylinders.

9. The exhaust manifold of claim 8, wherein the redirection cross-sectional area of flow, measured at the midpoint of the flange, is between 5% and 35% of the normalized cross-sectional area of flow of the first inlet flow passage.

10. The exhaust manifold of claim 8, wherein the exhaust redirection section includes:
a first portion;
a second portion spaced from the first portion; and
an intermediate portion extending between the first portion and the second portion, wherein the intermediate portion is arranged to face the outlet section, and wherein the intermediate portion includes a curved surface.

11. The exhaust manifold of claim 10, wherein the curved surface of the intermediate portion defines a radius that is approximately 50% of a standard diameter defined by the first inlet flow passage.

12. The exhaust manifold of claim 8, wherein the exhaust structure defines:
a first inlet flow passage;
a first exhaust inlet port disposed at an angle to the first inlet flow passage and arranged to receive exhaust gas via each of the first inlet flow passage and the first exhaust inlet port;
a second inlet flow passage extending along a horizontal axis of the exhaust structure; and
a second exhaust inlet port disposed at an angle to the second inlet flow passage and arranged to receive exhaust gas via each of the second inlet flow passage and the second exhaust inlet port.

13. The exhaust manifold of claim 8, wherein the flange is arranged to removably secure the intermediate section of the exhaust structure with a turbocharger associated with the engine.

14. The exhaust manifold of claim 8, wherein the redirection cross-sectional area of flow is measured at an opening between the single opening through the flange and a curved surface of the exhaust redirection section facing the single opening.

15. An exhaust structure for an exhaust manifold, the exhaust structure comprising:
a first inlet section that defines a first inlet flow passage;
a second inlet section that defines a second inlet flow passage; and
an intermediate section disposed between the first inlet section and the second inlet section and in fluid communication with each of the first inlet section and the second inlet section, the intermediate section including:
a flange;
an outlet section defining an outlet flow passage extending through the flange, the outlet flow passage being in fluid communication with each of the first inlet flow passage and the second inlet flow passage and including an outlet opening through the flange; and
an exhaust redirection section disposed between the first inlet section and the second inlet section such that exhaust from the first inlet section and from the second inlet section is configured to converge at the exhaust redirection section, the exhaust redirection section having areas of curvature configured to guide exhaust towards the outlet opening, including areas of curvature that define a ridge at a central portion of the exhaust redirection section.

16. The exhaust structure of claim 15, wherein the areas of curvature include a pair of curved portions that are located on opposite lateral sides of the ridge, the pair of curved portions each having a radius of curvature of about 20 mm to 70 mm and a length of about 10 mm to about 30 mm.

17. The exhaust structure of claim 15, wherein the areas of curvature include a curved portion located on the ridge, the curved portion having a radius of curvature of about 3 mm to 18 mm and a length of about 5 mm to about 45 mm.

18. The exhaust structure of claim 15, wherein the areas of curvature include a curved portion located on the ridge, the curved portion having a radius of curvature of about 1 mm to 20 mm and a length of about 10 mm to about 40 mm.

19. The exhaust structure of claim 15, wherein the areas of curvature include a pair of curved portions that are located on opposite lateral sides of the ridge, the pair of curved portions each having a radius of curvature of about 5 mm to 40 mm and a length of about 5 mm to about 20 mm.

20. The exhaust structure of claim 15, wherein the first inlet flow passage and the second inlet flow passage are obliquely angled with respect to a midline that passes through a center of an opening of the flange.

\* \* \* \* \*